S. BRETT.

Improvement in Bale-Ties.

No. 115,692.                                   Patented June 6, 1871.

UNITED STATES PATENT OFFICE.

SYDNEY BRETT, OF NEW YORK, N. Y.

IMPROVEMENT IN BALE-TIES.

Specification forming part of Letters Patent No. 115,692, dated June 6, 1871.

*To all whom it may concern:*

Be it known that I, SYDNEY BRETT, of the city, county, and State of New York, have invented a new and useful Improvement in Bale-Ties; and I do hereby declare the following to be a full, clear, and exact description thereof, which will enable those skilled in the art to make and use the same, reference being had to the accompanying drawing forming part of this specification, in which drawing—

Figure 1:
Figure 2:
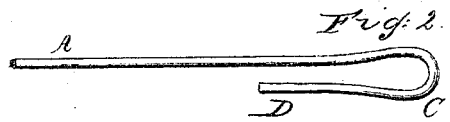
Figure 3:
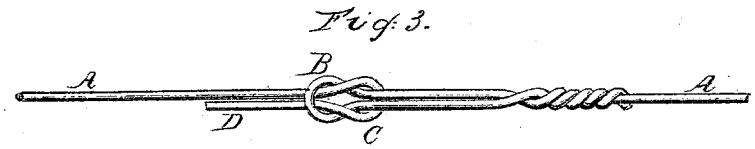

Figure 1 represents my improved tie after the parts are interlocked, and before they are strained by the release of the bale from the press. Fig. 2 represents the hooked end of the tie detached. Fig. 3 shows my improved tie interlocked, and after the strain from the released bale has come upon the tie.

Similar letters indicate corresponding parts.

This invention relates to ties for bales of cotton, hay, and other material; and consists in a metallic or wire tie, at one of whose ends I form an eye and at the other an open hook, which are interlocked by passing the hook backward through the eye until the limb of the hook has passed beyond the eye, and then bringing the limb of the hook around the shank of the eye and springing it into the eye so as to interlock the hook and eye together, the bight of the hook surrounding the back of the strands which form the eye, and the eye being arranged over the limb and body of the hook.

The letter A designates a wire tie, its two ends only being shown in the drawing. At one end I form an eye, B, which receives the hook next described. At the other end I form an open hook, C, whose transverse diameter is less than that of the eye, so that the bight of the hook can be pushed through the eye.

I place the tie in a bailing-press in the usual manner, and when the cotton or other material has been compressed so as to form a bale I pass the bight or body of the hook bodily through the eye in the direction of the arrow, Fig. 1, until the limb D of the hook is entirely through the eye, when I bring the limb around the wire A above the eye, and back again into the eye, to the position shown in Fig. 1.

When the parts are in the position shown in Fig. 1 the bale is released from compression, the expansion of the bale operates to draw the hook and eye out, one upon the other, until they are brought about to the condition represented in Fig. 3, the hook being drawn through the eye, and the sides, both of the hook and the eye, being pressed inward by their mutual action upon each other, so that they are closely confined to each other and there is no danger of their becoming disengaged.

My invention preserves the wire in its strength, and presents double strands at the parts which are interlocked.

What I claim as new, and desire to secure by Letters Patent, is—

The wire bale-tie, constructed as described, with the eye B upon one end and the hook C upon the opposite end, and applied to a bale in the manner herein set forth and shown.

SYDNEY BRETT

Witnesses:
W. HAUFF,
E. F. KASTENHUBER.